US 7,991,143 B2

(12) United States Patent
Abramson et al.

(10) Patent No.: US 7,991,143 B2
(45) Date of Patent: Aug. 2, 2011

(54) RAPID RESPONSE TO USER INPUT AT A TELECOMMUNICATIONS TERMINAL

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1015 days.

(21) Appl. No.: 11/842,468

(22) Filed: Aug. 21, 2007

(65) Prior Publication Data
US 2009/0052650 A1    Feb. 26, 2009

(51) Int. Cl.
H04M 3/42    (2006.01)
H04M 7/00    (2006.01)

(52) U.S. Cl. ............... 379/225; 379/207.02; 455/554.1; 455/555

(58) Field of Classification Search .............. 379/211.02, 379/225, 207.02, 231–234; 455/414.1, 554.1, 455/555
See application file for complete search history.

(56) References Cited

U.S. PATENT DOCUMENTS

| | | | | |
|---|---|---|---|---|
| 5,978,687 A | * | 11/1999 | Maenpaa | 455/555 |
| 6,285,879 B1 | * | 9/2001 | Lechner et al. | 455/432.3 |
| 6,571,108 B1 | * | 5/2003 | Otsuka et al. | 455/433 |
| 6,967,947 B1 | | 11/2005 | Chen et al. | |
| 2006/0141991 A1 | | 6/2006 | House et al. | |

FOREIGN PATENT DOCUMENTS

| | | |
|---|---|---|
| GB | 2355624 A | 4/2001 |
| GB | 2431824 | 2/2007 |
| WO | 2006015013 A2 | 2/2006 |
| WO | 2006067783 | 6/2006 |

OTHER PUBLICATIONS

Domingos, Luis, "EP Application No. 08001029.1 European Search Report Jul. 17, 2009", , Publisher: EPO, Published in: EP.

* cited by examiner

*Primary Examiner* — Harry S Hong
(74) *Attorney, Agent, or Firm* — DeMont & Breyer, LLC (57) ABSTRACT

An apparatus and methods are disclosed for use by organizations that have PBXs at a plurality of sites. The invention pertains to cell phone calls from an affiliated terminal to her "home" private branch exchange. For example, an employee who works at the Chicago branch office might call the Chicago office's PBX to invoke a feature such as setting up call forwarding, retrieving voice mail, etc. Such calls might be automatically and transparently directed to another PBX when it is advantageous to do so. In the illustrative embodiment, the need or desirability to redirect such calls to another PBX is ascertained while the caller is still in the process of entering all of the required calling information. The effect of assessing whether to redirect the call in parallel with the caller entering the information is to reduce the delays otherwise experienced by the caller when placing calls outside of the enterprise area served by the home private branch exchange.

20 Claims, 7 Drawing Sheets

Figure 2 (PRIOR ART)

| PBX On-Premises Telephone Number | Off-Premises Telephone Number |
|---|---|
| 732-555-0102 x11 | 201-555-1236 |
| 732-555-0102 x12 | 908-555-3381 |
| ... | ... |
| 732-555-0102 x99 | 212-555-6784 |

RAPID RESPONSE TO USER INPUT AT A TELECOMMUNICATIONS TERMINAL

FIELD OF THE INVENTION

The present invention relates to telecommunications in general, and, more particularly, placing a call to a second private branch exchange based on determining whether a telecommunications terminal user is trying to place a call to a first private branch exchange (PBX).

BACKGROUND OF THE INVENTION

An organization that desires to provide employees at one location with telephones has, in general, two options. First, the organization can acquire one telephone and one telephone line per employee from the telephone company. Second, the organization can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." In addition, private-branch exchanges typically provide a variety of useful telecommunications features to their users, such as call forwarding, three-way conferencing, and so forth.

Figure 1:
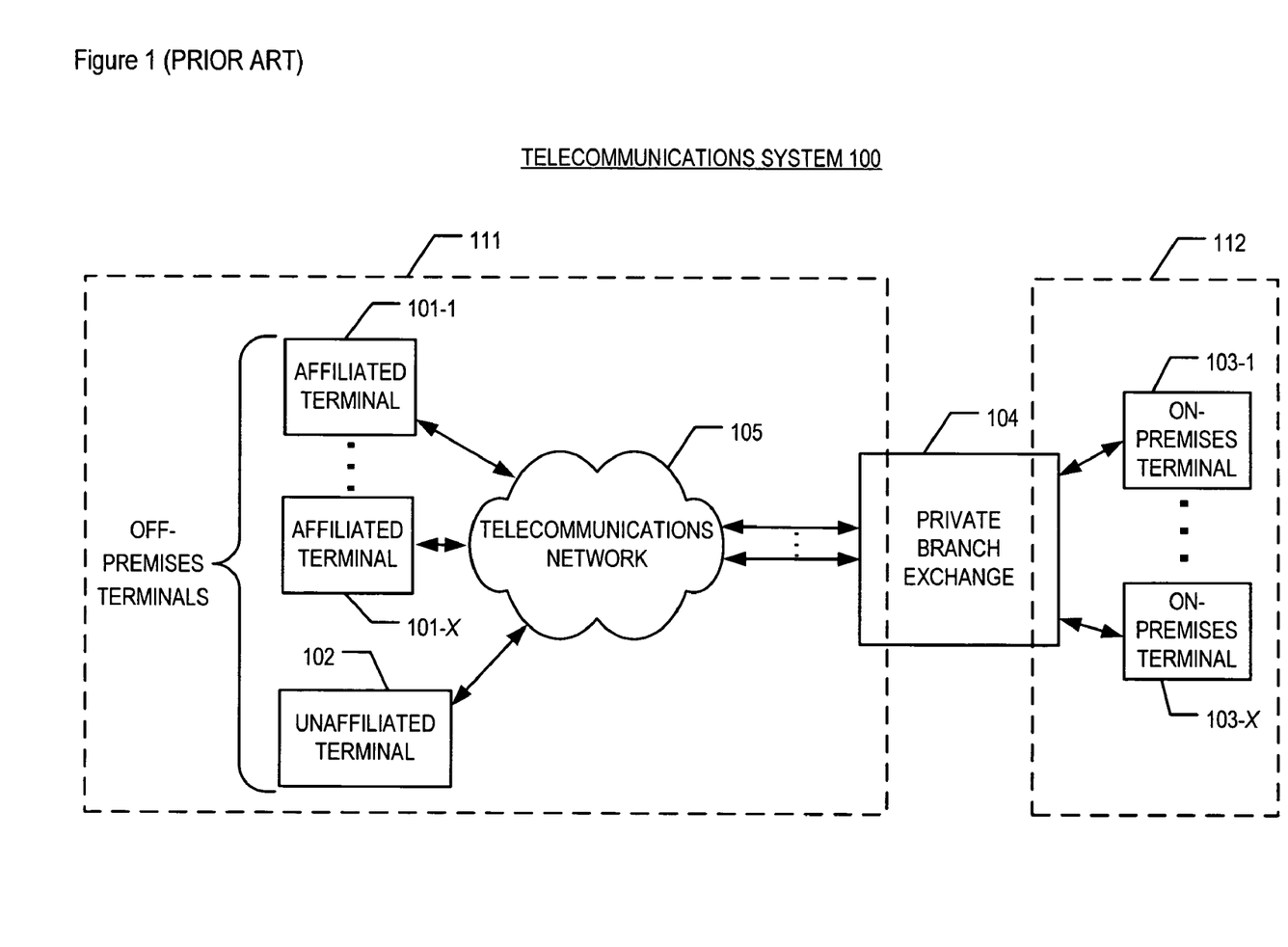
FIG. 1 depicts a schematic diagram of telecommunications system 100, in accordance with the prior art.

FIG. 1 depicts a schematic diagram of telecommunications system 100 in the prior art. Telecommunications system 100 comprises affiliated off-premises telecommunications terminals 101-1 through 101-X, wherein X is a positive integer; unaffiliated off-premises telecommunications terminal 102; affiliated on-premises telecommunications terminals 103-1 through 103-X; private branch exchange telephone system 104; and telecommunications network 105, interconnected as shown.

Figure 2:
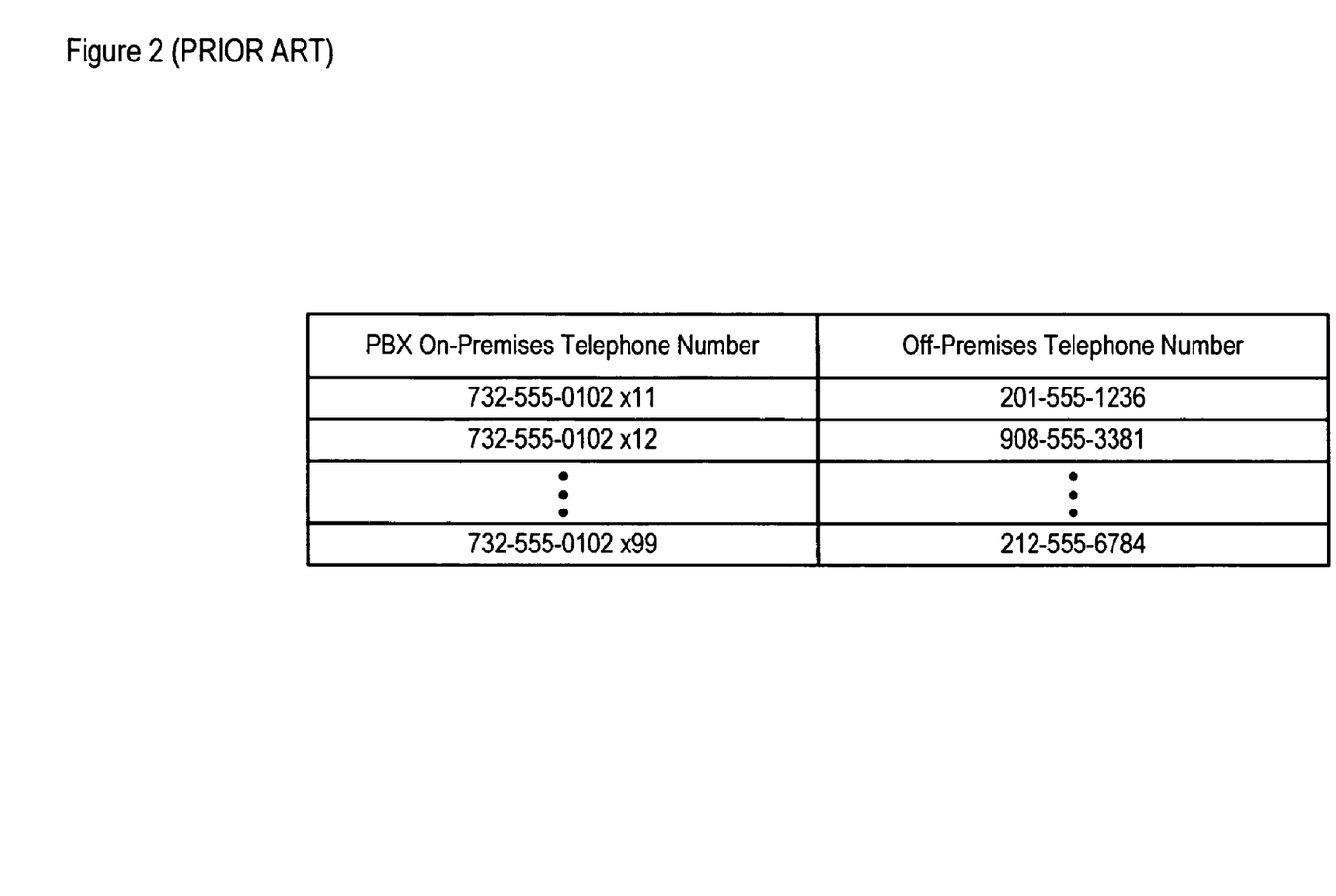
FIG. 2 depicts an illustrative table that maps off-premises telephone numbers to on-premises telephone numbers, in accordance with the prior art.

The terms "affiliated" and "unaffiliated," as they apply to the off-premises terminals, refer to whether an off-premises terminal is affiliated with an on-premises terminal (i.e., a terminal served by private branch exchange 104). The relationship of an on-premises terminal (e.g., terminal 103-1, etc.) with an affiliated off-premises terminal (e.g., terminal 101-1, etc.) is described below and with respect to FIG. 2, with regards to extending a received call to one or both terminals.

Private branch exchange 104 is capable of switching incoming calls from telecommunications network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to telecommunications network 105 via one or more transmission lines that connect private branch exchange 104 to telecommunications network 105.

Private branch exchange 104 is capable of also extending an incoming call to a telephone number in telecommunications network 105, in addition to switching the incoming call to on-premises terminal 103-$n$, wherein n is an integer between 1 and N, inclusive. The telephone number that is extended-to in telecommunications network 105 corresponds to an affiliated terminal 101-$n$.

In addition, private branch exchange 104 is capable of providing telecommunications features that enable the forwarding of calls, the transferring of calls, conferencing, etc. Typically each user of an on-premises terminal 103-$n$ can create a customized profile that is stored at private branch exchange 104 and indicates to private branch exchange 104 how to present information to and respond to signal from on-premises terminal 103-$n$ and its affiliated terminal 101-$n$. A customized profile might include information such as defaults for various settings and options, what language to use for voice prompts, what menu items to present, how to associate number keys to menu items, and so forth.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private branch exchange 104.

Private branch exchange 104 acts as a "bridge" between address space 111 and address space 112. When a calling party places a call to someone served by private branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on-premises telephone number is one that exists within the address space of the private branch exchange, and an off-premises telephone number is one that exists within the address space of the Public Switched Telephone Network.

Some private branch exchanges enable the user of an on-premises terminal to associate an off-premises terminal's telephone number (e.g., the user's cell phone number, etc.) with the on-premises terminal's telephone number for features such as automatic call forwarding. In such instances the off-premises terminal's telephone number is said to be mapped to the on-premises terminal's telephone number. Typically a private branch exchange that provides such a mapping feature stores the mappings in a table, such as the one shown in FIG. 2.

SUMMARY OF THE INVENTION

The present invention is applicable to organizations that have private branch exchanges (PBXs) at two or more different sites, and pertains to calls from an affiliated off-premises terminal (typically, an employee's cell phone) to its "home" private branch exchange. For example, an employee who works at an organization's New York branch office might call the New York office's PBX to invoke a feature such as setting up call forwarding, canceling call forwarding, retrieving voice mail, and so forth.

When it is determined that an employee is placing such a call, the call might be automatically and transparently directed to another PBX of the organization when it is advantageous to do so. Re-directing a call to another private branch exchange might be advantageous for a number of reasons, such as for the purposes of security, for reducing toll charges, because of unavailability of a particular private branch exchange (perhaps based in part on the time zones in which the PBXs are located), etc.

In accordance with the illustrative embodiment, the determination that the employee is placing the call is performed before the employee has keyed in all of the required calling information. The desired functionality is provided via software on the affiliated terminals (i.e., employees' cell phones). In particular, an extra layer of software operates on the affiliated terminals that monitors the user's input and determines as quickly as possible when the user is in the process of entering keystrokes, or other types of input, for placing a call. As soon as this determination is made, the terminal initiates the PBX redirection, connection, and authentication processes before the user has completed entering the necessary input such as the telephone number, keystrokes to navigate a contact directory, and so forth. The present invention therefore reduces the delays that can be experienced by users when placing a call from outside the enterprise area that is served by the home private branch exchange.

When a call to an employee's home private branch exchange is re-directed to a different private branch exchange, the re-direction is done automatically and transparently in such a manner that the user is unaware of its occurrence. In addition, the present invention enables the "non-home" private branch exchange to interact with the user in the same manner as the home private branch exchange (e.g., with the same default values, preferred language, etc.). As a result, the re-directed call appears no different to the user than a call to her home private branch exchange.

The illustrative embodiment comprises: (a) receiving at a telecommunications terminal a series of inputs, each input corresponding to a data entry by a user of the telecommunications terminal; (b) determining, in response to at least one input having been received in the series of inputs, whether the user is placing a first call to a first private branch exchange, the determination being based on one or more of the inputs already received, wherein the telephone number M of the telecommunications terminal (i) is not in the address space of the first private branch exchange, and (ii) is mapped to a telephone number N in the address space of the first private branch exchange; (c) placing, in response to determining that the user is placing the first call to the first private branch exchange, a second call from the telecommunications terminal to a second private branch exchange whose address space does not contain M and does not contain a telephone number to which M is mapped; and (d) receiving at least one additional input from the user of the telecommunications terminal, wherein the at least one additional input would have been necessary to complete the first call.

DETAILED DESCRIPTION

Figure 3:
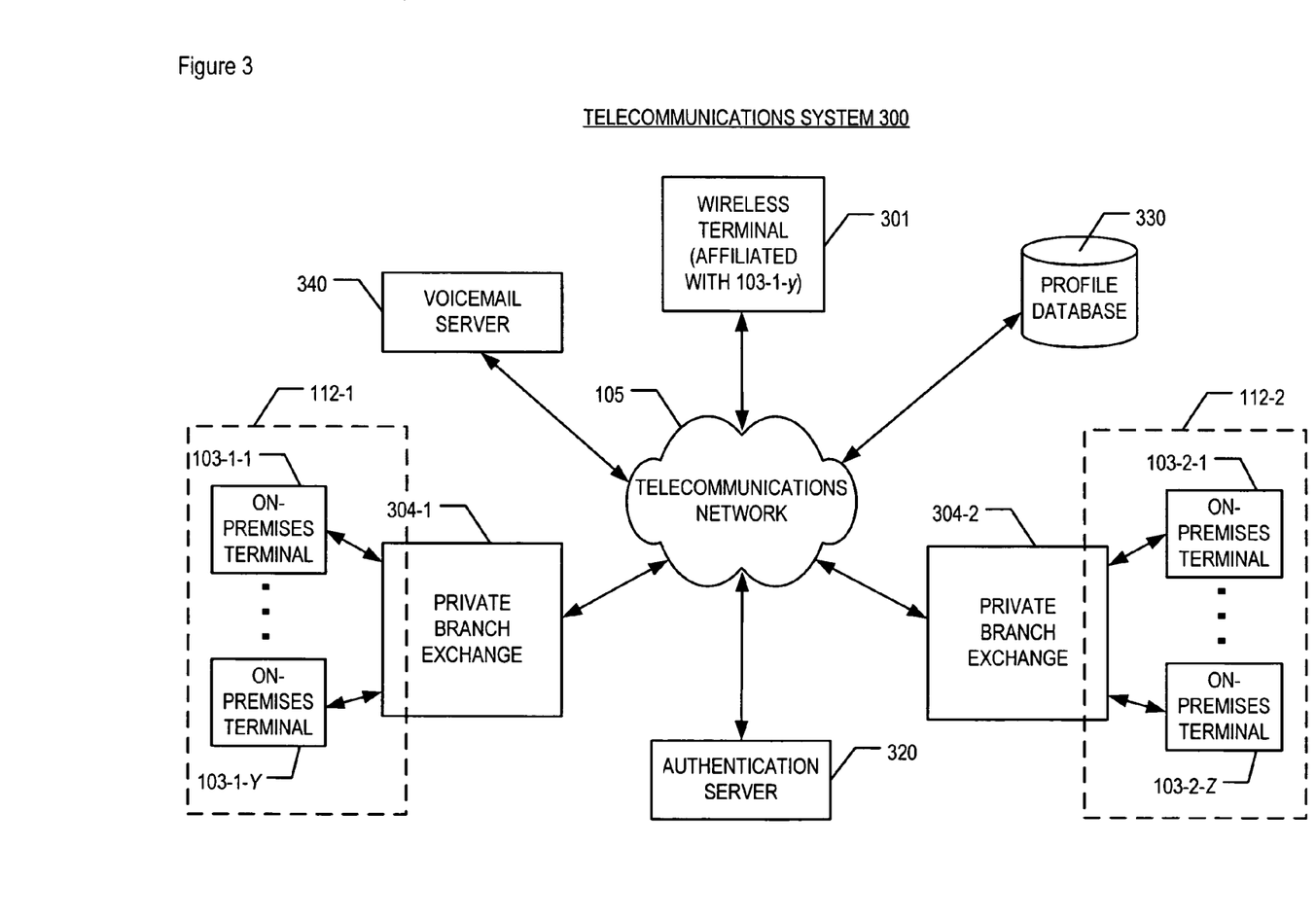
FIG. 3 depicts a schematic diagram of telecommunications system 300, in accordance with the illustrative embodiment of the present invention.

FIG. 3 depicts a schematic diagram of telecommunications system 300, in accordance with an illustrative embodiment of the present invention. Telecommunications system 300 comprises telecommunications network 105, private branch exchange 304-1, on-premises terminals 103-1-1 through 103-1-Y, private branch exchange 304-2, on-premises terminals 103-2-1 through 103-2-Z, authentication server 320, profile database 330, voicemail server 340, and off-premises wireless telecommunications terminal 301, interconnected as shown.

Private branch exchanges 304-1 and 304-2 provide all the functionality of private branch exchange 104 of the prior art, and are also capable of performing the tasks of FIG. 7, described below.

On-premises terminals 103-1-1 through 103-1-Y are the same as on-premises terminals 103 of the prior art, and are associated with private branch exchange 304-1. As shown in FIG. 3, the telephone numbers of on-premises terminals 103-1-1 through 103-1-Y exist in address space 112-1.

On-premises terminals 103-2-1 through 103-2-Z are the same as on-premises terminals 103 of the prior art, and are associated with private branch exchange 304-2. As shown in FIG. 3, the telephone numbers of on-premises terminals 103-2-1 through 103-2-Z exist in address space 112-2.

Authentication server 320 is a server that is capable of presenting authentication challenges to telecommunications terminals, of receiving responses from challenged terminals, and of determining the correctness of responses, as is well-known in the art. The manner in which authentication server 320 performs its authentication functions in accordance with the illustrative embodiment is described below and with respect to FIG. 7.

As will be appreciated by those skilled in the art, in some other embodiments of the present invention, authentication might be performed by an entity other than a centralized authentication server—such as a user's home private branch exchange, or a "local" authentication server attached to the home PBX, or perhaps the private branch exchange to which a call is re-directed—and it will be clear to those skilled in the art, after reading this specification, how to make and use such embodiments.

Profile database 330 is a database of PBX profiles for every on-premises telephone number of the organization (in the illustrative embodiment, the telephone numbers of terminals 103-1-1 through 103-1-Y and terminals 103-2-1 through 103-2-Z). The profiles stored in profile database 330 contain individualized information about a user's preferences when interacting with its home PBX 304, such as the user's preferred language, preferred timeout durations, customized menus, etc., as is well-known in the art.

In accordance with the illustrative embodiment, the profile for a particular on-premises telephone number is stored at the home PBX 304 for that telephone number in addition to profile database 330. It will be clear to those skilled in the art, after reading this specification, how to make and use other embodiments of the present invention in which profiles might be stored only at profile database 330, or only at the home PBX 304, or at one or more "non-home" private branch exchanges in addition to the home PBX. Furthermore, the tradeoffs involved in fault-tolerance, consistency, and readvs.-write performance for each possible implementation are well-understood by those skilled in the art.

Voicemail server 340 is a server that stores voicemail for all of the on-premises telephone numbers of the organization (in the illustrative embodiment, the telephone numbers of terminals 103-1-1 through 103-1-Y and terminals 103-2-1 through 103-2-Z). As will be appreciated by those skilled in the art, in some embodiments of the present invention, voicemail might be stored "locally" at each private branch exchange 304 instead of at a centralized server, and it will be clear, how to make and use such embodiments after reading this specification.

Figure 4:
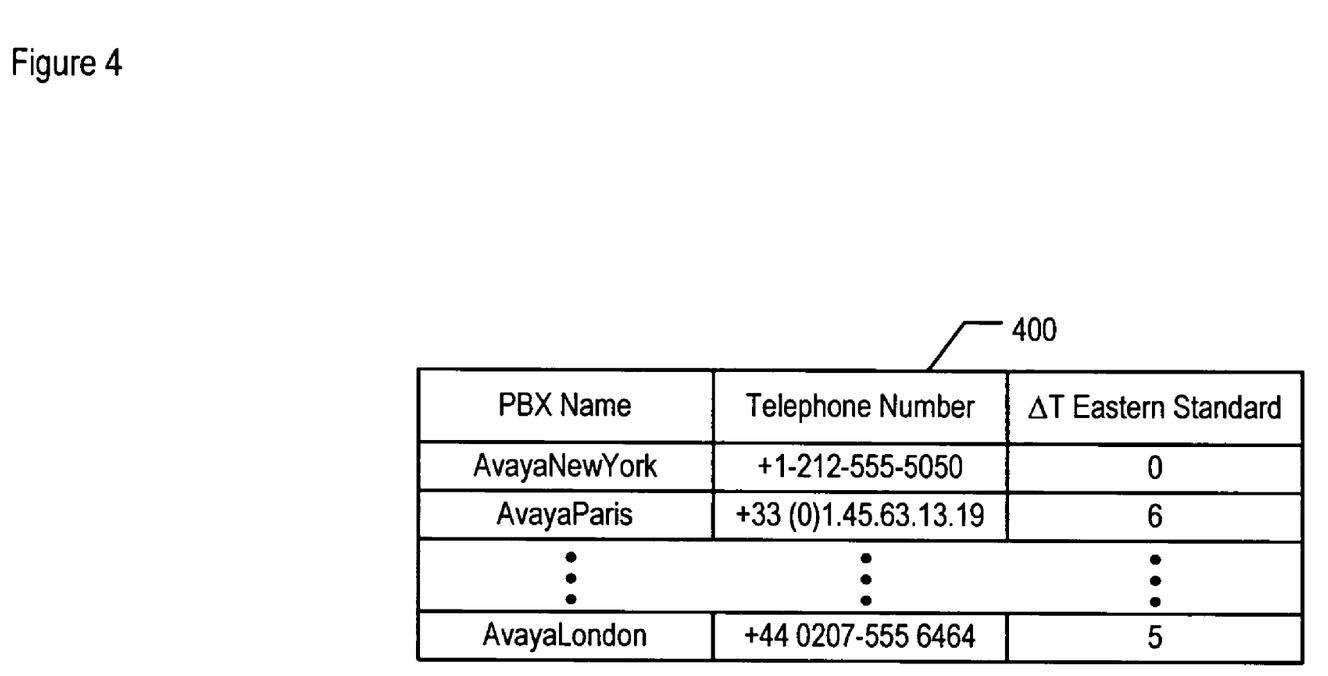
FIG. 4 depicts illustrative table 400 that is stored at affiliated wireless telecommunications terminal 301, as shown in FIG. 3, in accordance with the illustrative embodiment of the present invention.

Off-premises wireless telecommunications terminal 301 is a wireless telecommunications terminal (e.g., cell phone, etc.) that is affiliated with one of the on-premises terminals 103 of private branch exchange 304-1 (say 103-1-$y$, where y is an integer between 1 and Y, inclusive). In accordance with the illustrative embodiment, wireless telecommunications terminal 301 is capable of storing a table of the organization's private branch exchanges and related information, such as illustrative table 400 shown in FIG. 4, and of performing the tasks of FIGS. 5 and 6, described below.

As will be appreciated by those skilled in the art, for the purposes of simplicity telecommunications system 300 of the illustrative embodiment has only two private branch exchanges 304-1 and 304-2. However, it will be clear to those skilled in the art, after reading this specification, how to make and use embodiments of the present invention for organizations that have P private branch exchanges, where P is an integer greater than two.

Figure 5:
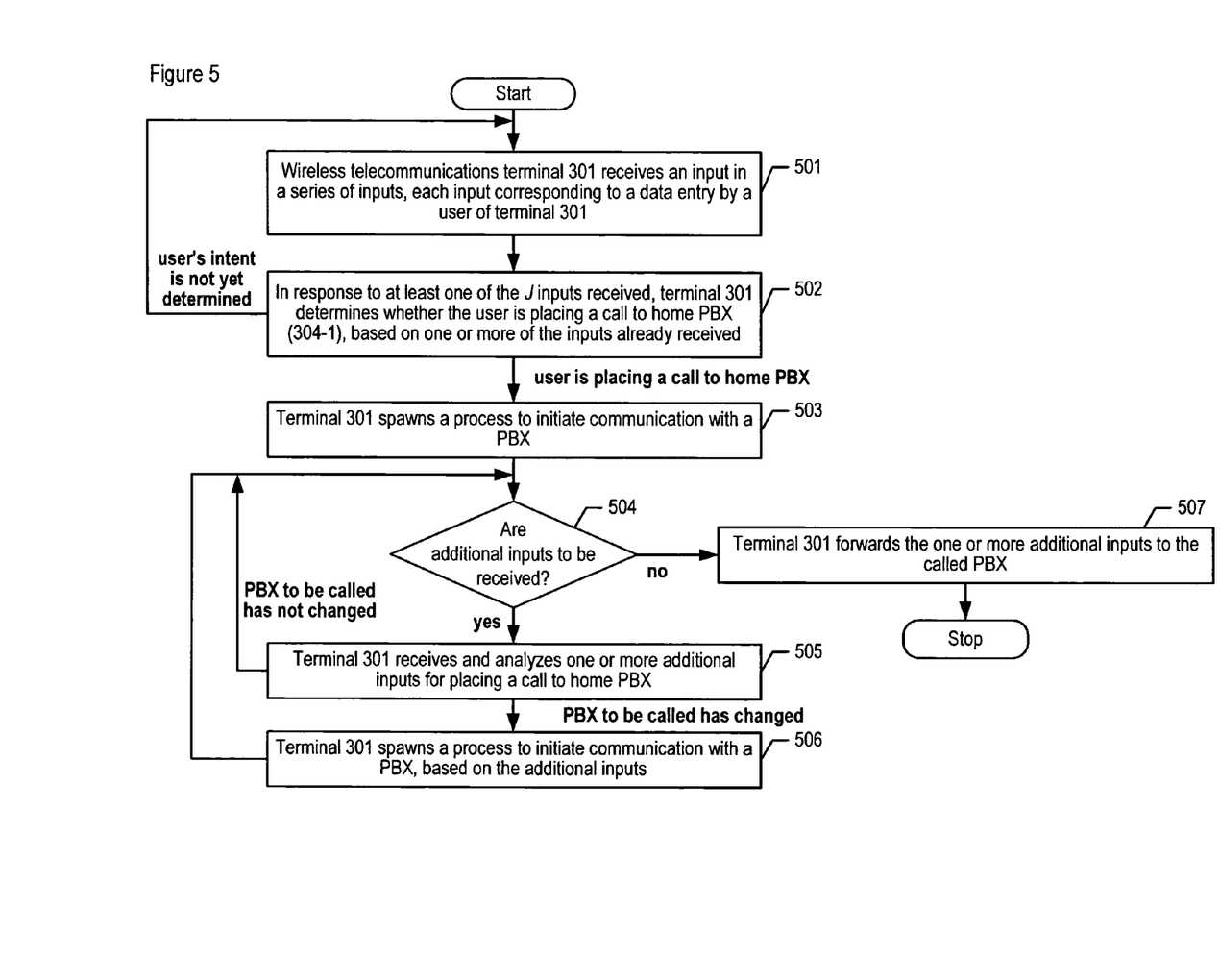
FIG. 5 depicts a flowchart of the salient tasks of affiliated telecommunications terminal 301 that comprise receiving a series of inputs for determining a user's intent, in accordance with the illustrative embodiment of the present invention.

FIG. 5 depicts a flowchart of the salient tasks of affiliated telecommunications terminal 301 that comprise receiving a series of inputs from a user for determining the user's intent, in accordance with the illustrative embodiment of the present invention. It will be clear to those skilled in the art which tasks depicted in FIG. 5 can be performed simultaneously or in a different order than that depicted.

At task 501, wireless telecommunications terminal 301 receives one or more inputs in a series of individual data inputs. In accordance with the illustrative embodiment, each input corresponds to a data entry by a user of terminal 301, such as the entry of a numeric digit (e.g., "one", "two", etc.) or a command (e.g., "send" key being depressed, etc.). Each input, for example, can correspond to a keystroke by the user on the keypad of terminal 301, where the user is providing information to the terminal for the purpose of keying in a telephone number, navigating a contact directory, and so forth. In some embodiments, each data entry is indivisible, such as a single keystroke. As those who are skilled in the art will appreciate, each input might correspond to another type of data entry by the user, such as speaking the information into the terminal's microphone.

At task 502, terminal 301 determines, after receiving J inputs, whether its user is placing a call to her home private branch exchange (i.e., the private branch exchange 304 whose address space contains a telephone number to which wireless terminal 301's telephone number is mapped). In the illustrative embodiment, wireless terminal 301's home PBX is 304-1 because wireless terminal 301 is affiliated with on-premises terminal 103-1-$y$. Techniques for completing or predicting a string that is being entered by a terminal's user, based at least in part on the characters that have already been entered, are well-known in the art.

As those who are skilled in the art will appreciate, the value for J, which is greater than or equal to one, can be selected for a particular operating mode, thereby affecting the speed and accuracy of the prediction. In other words, terminal 301 can wait until it receives multiple inputs, before it attempts to determine whether its user is placing a call to the home PBX. The value for J can be based upon one or more factors, which include i) the network to which terminal 301 is connected at the time that the determination at task 502 is made, ii) the numbering plan in effect (i.e., of the connected network), iii) the number of PBXs for which information is stored at terminal 301, as described earlier with respect to FIG. 4, or iv) the type of data entry being made by terminal 301's user (e.g., a phone number, a contact list selection, etc.).

Additionally, the value for J can be varied, either by the user herself or by a source other than the user (e.g., the manufacturer, the network provider, etc.). For example, the prediction can be made faster, to the point where only a minimum of inputs is required (i.e., the value for J is made small) to determine that the user wants to call the home PBX, resulting in a higher error probability in the prediction. At the other extreme, the prediction can be made more accurate (i.e., the value for J is made large), to the point where many inputs are required to determine that the user wants to call the home PBX, resulting in a lower error probability—or even a zero error probability—in the prediction.

If terminal 301 determines that the user is, in fact, in the process of placing a call to the home PBX, task execution proceeds to task 503. Otherwise, task execution proceeds back to task 501 for the purpose of receiving additional inputs.

In accordance with the illustrative embodiment, terminal 301 performs task 502 in response to each input received. As those who are skilled in the art will appreciate, however, terminal 301 can perform task 502 based on a combination of inputs that is other than each and every input.

At task 503, terminal 301 spawns a process to initiate communication with a private branch exchange that is not necessarily the home PBX. The spawned process is described below and with respect to FIG. 6. Meanwhile, task execution continues to task 504.

At task 504, terminal 301 determines if additional inputs are being received or are expected. For example, a total of K inputs might be necessary to complete the call that the user is in the process of placing to the home PBX. If more inputs are to be received, task execution proceeds to task 505. Otherwise, task execution proceeds to task 507.

At task 505, terminal 301 continues to receive one or more inputs for placing a call to the home PBX. Terminal 301 continues to analyze the additional received inputs and to predict what the user is trying to dial. For example, the additional inputs might be considered for the purpose of improving the accuracy of the prediction. As another example, the additional inputs might be checked in the event that terminal 301 moves into a new network while its user is entering calling data, thereby possibly dictating a different PBX to call. If the continued analysis results in a new PBX to be called that is other than the one called at task 503, then task execution proceeds to task 506. Otherwise, task execution proceeds back to task 504 to determine if additional inputs are to be received.

At task 506, terminal 301 spawns a process to initiate communication with a private branch exchange that is not necessarily the home PBX or the PBX called at task 503. The spawned process is described below and with respect to FIG. 6. In some embodiments, terminal 301 also terminates any previous call that was placed or in the process of being placed, either at task 503 or at a previous iteration of task 506. Meanwhile, task execution continues back to task 504.

Figure 6:
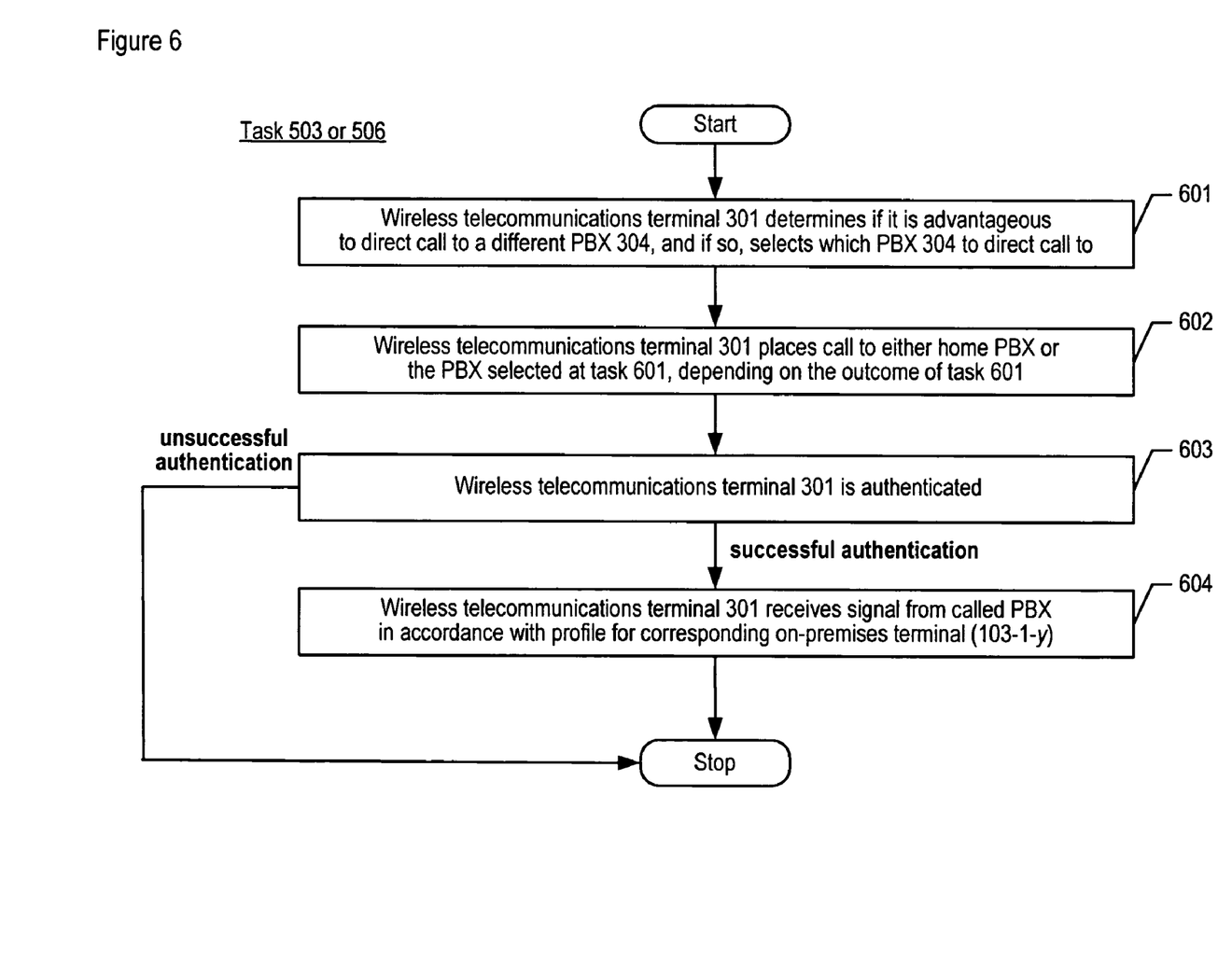
FIG. 6 depicts a flowchart of the salient tasks of affiliated telecommunications terminal 301 that comprise initiating communication with a private branch exchange, in accordance with the illustrative embodiment of the present invention.

At task 507, terminal 301 forwards the one or more additional inputs received to the private branch exchange that the prediction eventually converges upon, as the result of the final process spawned, as discussed with respect to FIG. 6. In some embodiments, the PBX that is receiving the inputs from terminal 301 stores and then forwards, to the home PBX, some or all of the inputs received. The forwarding of the inputs to the home PBX is consistent with the user of terminal 301 having made the call in the first place for the purpose of communicating information to the home PBX.

After task 507, the method of FIG. 5 terminates.

FIG. 6 depicts a flowchart of the salient tasks of affiliated telecommunications terminal 301 that comprise initiating communication with a private branch exchange, in accordance with the illustrative embodiment of the present invention. It will be clear to those skilled in the art which tasks depicted in FIG. 6 can be performed simultaneously or in a different order than that depicted.

At task 601, wireless telecommunications terminal 301 determines if it is advantageous to direct the call to a different private branch exchange, and if so, selects which private branch exchange to direct the call to (in the illustrative embodiment, the only choice is 304-2). As discussed above, the determination of whether it is advantageous to direct a call to a different PBX could be based on a number of factors such as security, toll charges, PBX availability, etc.; similarly, the selection of a particular private branch exchange for the redirected call could be based on factors such as the day and time of the call, the network that wireless terminal 301 is currently connected to, etc.

At task 602, wireless telecommunications terminal 301 places a call to either the home private branch exchange or the private branch exchange selected at task 601, depending on the outcome of task 601.

At task 603, wireless telecommunications terminal 301 is authenticated, in well-known fashion. In accordance with the illustrative embodiment, wireless terminal 301 is authenticated by authentication server 320 via a challenge/response mechanism, in well-known fashion. As will be appreciated by those skilled in the art, in some embodiments of the present invention the challenge/response mechanism might require input from the user of terminal 301 (e.g., a username and password, etc.), while in some other embodiments, wireless terminal 301 might be authenticated without any user input— and perhaps, without the user's awareness. As described above, it will be clear to those skilled in the art how to make use alternative embodiments of the present invention in which task 603 is performed by one or more entities other than authentication server 320.

If the authentication of task 603 is successful, execution continues at task 604, otherwise execution of the method of FIG. 6 terminates.

At task 604, wireless telecommunications terminal 301 receives a signal from called private branch exchange 304-*p* in accordance with the appropriate profile (i.e., the profile for on-premises terminal 103-1-*y* with which wireless terminal 301 is affiliated.)

After task 604, the method of FIG. 6 terminates.

Figure 7:
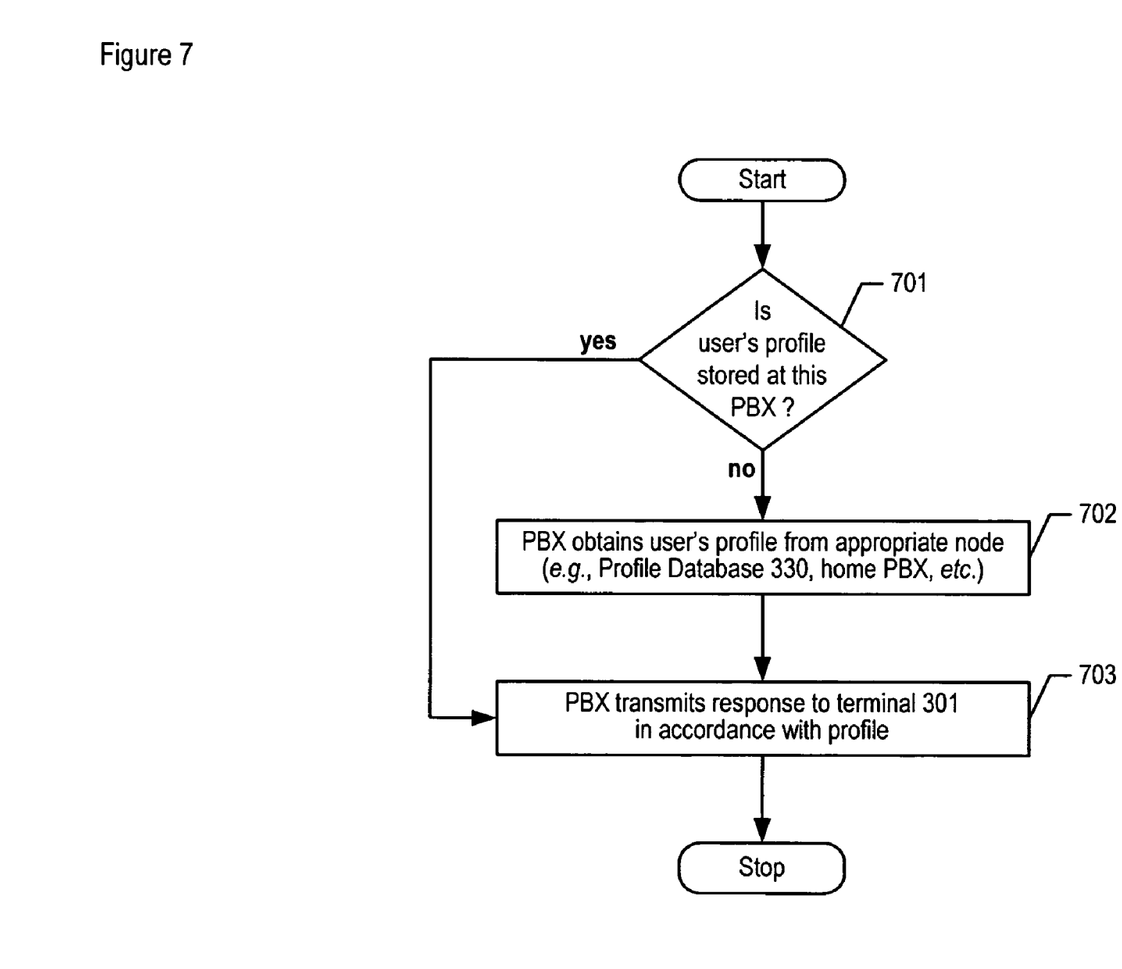
FIG. 7 depicts a flowchart of the salient tasks of private branch exchange 304-$p$, in accordance with the illustrative embodiment of the present invention.

FIG. 7 depicts a flowchart of the salient tasks of private branch exchange 304-*p*, where p is an integer from 1 to P, inclusive, and P is the number of private branch exchanges in the organization (two in the illustrative embodiment). It will be clear to those skilled in the art which tasks depicted in FIG. 7 can be performed simultaneously or in a different order than that depicted.

At task 701, private branch exchange 304-*p* checks whether the appropriate user profile (i.e., the profile for on-premises terminal 103-1-*y* with which wireless terminal 301 is affiliated) is stored at private branch exchange 304-*p*. In accordance with the illustrative embodiment, this profile is stored only at its home PBX and in profile database 330. However, as discussed above, in some embodiments of the present invention a profile might be stored at one or more other private branch exchanges 304—perhaps cached at a particular PBX during a previous call from wireless terminal 301, or perhaps replicated for fault-tolerance or performance issues.

If the profile is stored at private branch exchange 304-*p*, execution continues at task 703, otherwise execution proceeds to task 702.

At task 702, private branch exchange 304-*p* obtains the profile from the appropriate node (e.g., profile database 330, the home private branch exchange, etc.) in well-known fashion.

At task 703, private branch exchange 304-*p* transmits a response to wireless telecommunications terminal 301 in accordance with the profile, in well-known fashion.

After task 703, the method of FIG. 7 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   (a) receiving at a telecommunications terminal a series of inputs, each input corresponding to a data entry by a user of the telecommunications terminal;
   (b) determining, in response to at least one input having been received in the series of inputs, whether the user is placing a first call to a first private branch exchange, the determination being based on one or more of the inputs already received, wherein the telephone number M of the telecommunications terminal
      (i) is not in the address space of the first private branch exchange, and
      (ii) is mapped to a telephone number N in the address space of the first private branch exchange;
   (c) placing, in response to determining that the user is placing the first call to the first private branch exchange, a second call from the telecommunications terminal to a second private branch exchange whose address space does not contain M and does not contain a telephone number to which M is mapped; and
   (d) receiving at least one additional input from the user of the telecommunications terminal, wherein the at least one additional input would have been necessary to complete the first call.

2. The method of claim 1 wherein each data entry made by the user is indivisible.

3. The method of claim 2 wherein the data entry is a keystroke.

4. The method of claim 2 wherein the data entry is a vocal expression.

5. The method of claim 1 wherein the determination is made with an error probability that is greater than zero.

6. The method of claim 5 further comprising continuing to analyze the series of inputs, based on the receiving of the least one additional input.

7. The method of claim 6 further comprising placing a third call to a private branch exchange other than the second private branch exchange, based on the at least one additional input.

8. A method comprising:
   (a) receiving at a telecommunications terminal a series of inputs, each input corresponding to a data entry by a user of the telecommunications terminal;

(b) determining, at time $t_1$ and in response to at least J inputs having been received in the series of inputs, that the user is placing a first call to a first private branch exchange, wherein the telephone number M of the telecommunications terminal
  (i) is not in the address space of the first private branch exchange, and
  (ii) is mapped to a telephone number N in the address space of the first private branch exchange; and
(c) placing, in response to the determination at time $t_1$, a second call from the telecommunications terminal to a second private branch exchange whose address space does not contain M and does not contain a telephone number to which M is mapped;
wherein K inputs would have been necessary to complete the first call to the first private branch exchange, K being greater than J, and J being based on the network to which the telecommunications terminal is connected at the time $t_1$.

9. The method of claim 8 wherein the data entry is a keystroke.

10. The method of claim 8 wherein the data entry is a vocal expression.

11. The method of claim 8 further comprising continuing to analyze the series of inputs, based on receiving at least a $(J+1)^{th}$ input.

12. The method of claim 11 further comprising placing a third call from the telecommunications terminal to a private branch exchange other than the second private branch exchange, based on at least the $(J+1)^{th}$ input.

13. A method comprising:
(a) receiving at a telecommunications terminal i) a first series of inputs and ii) a non-overlapping second series of inputs;
(b) determining, at time $t_1$ and in response to at least $J_1$ inputs having been received in the first series of inputs, that the user is placing a first call to a first private branch exchange, wherein the telephone number M of the telecommunications terminal
  (i) is not in the address space of the first private branch exchange, and
  (ii) is mapped to a telephone number N in the address space of the first private branch exchange;
(c) placing, in response to the determination at time $t_1$, a call $C_1$ from the telecommunications terminal to one of i) the first private branch exchange and ii) a second private branch exchange;
(d) determining, at time $t_2$ and in response to at least $J_2$ inputs having been received in the second series of inputs, that the user is placing a second call to the first private branch exchange; and
(e) placing, in response to the determination at time $t_2$, a call $C_2$ from the telecommunications terminal to one of i) the first private branch exchange and ii) the second private branch exchange;
wherein K inputs would have been necessary to complete the first call to the first private branch exchange, $J_1$ being less than $J_2$, and K is greater than $J_1$.

14. The method of claim 13 wherein $J_1$ is based on the network to which the telecommunications terminal is connected at the time $t_1$.

15. The method of claim 14 wherein $J_2$ is based on the network to which the telecommunications terminal is connected at the time $t_2$.

16. The method of claim 14 wherein $J_1$ is based on the numbering plan of the network to which the telecommunications terminal is connected at the time $t_1$.

17. The method of claim 13 wherein $J_1$ is based on the number of private branch exchanges for which information is stored at the telecommunications terminal.

18. The method of claim 13 wherein each input corresponds to a data entry by the user of the telecommunications terminal, and wherein $J_1$ is based on the type of data entry made by the user.

19. The method of claim 13 further comprising continuing to analyze the first series of inputs, based on receiving at least a $(J_1+1)^{th}$ input.

20. The method of claim 19 further comprising placing a call $C_3$ from the telecommunications terminal to a private branch exchange other than the exchange called in the call $C_1$, based on at least the $(J_1+1)^{th}$ input.

* * * * *